United States Patent [19]
Karr, Jr. et al.

[11] 3,807,688
[45] Apr. 30, 1974

[54] GATE VALVE

[75] Inventors: Michael A. Karr, Jr.; Bert L. Morrison, both of Houston, Tex.

[73] Assignees: M & J Valve Company; M & J Development Company, both of Houston, Tex.

[22] Filed: May 15, 1972

[21] Appl. No.: 253,028

[52] U.S. Cl.............................. 251/174, 251/194
[51] Int. Cl.............................................. F16k 5/06
[58] Field of Search ........... 251/170, 171, 172, 174, 251/176, 193, 196, 327, 328

[56] References Cited
UNITED STATES PATENTS

| 2,718,372 | 9/1955 | Broz | 251/174 |
| 3,372,900 | 3/1968 | Grove | 251/327 X |
| 3,301,523 | 1/1967 | Lowrey | 251/328 X |
| 880,463 | 2/1908 | Paul | 251/328 |
| 1,500,908 | 7/1924 | Van Derson | 251/328 X |

*Primary Examiner*—Harold W. Weakley

[57] ABSTRACT

A gate valve construction having means for retaining a desired spacing between the seat rings when the gate is moved to open position.

3 Claims, 6 Drawing Figures

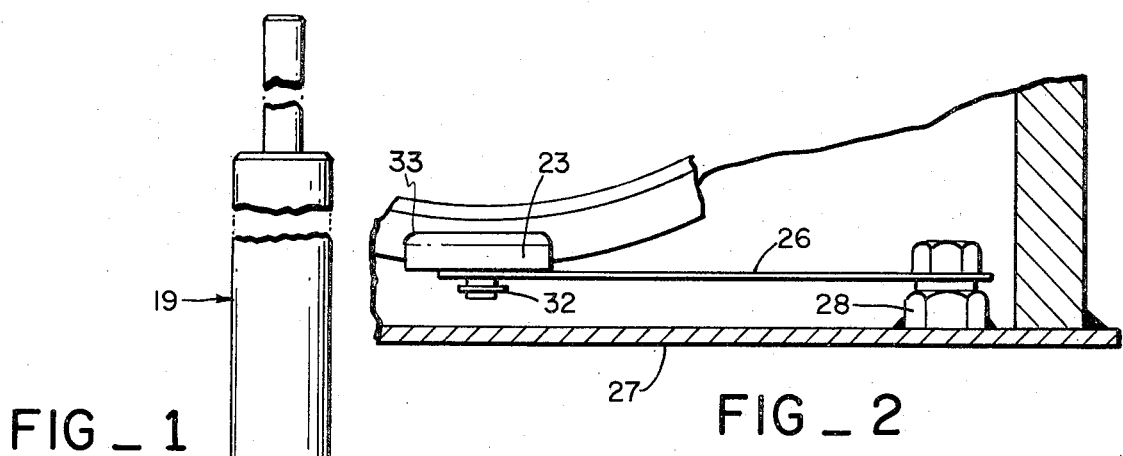
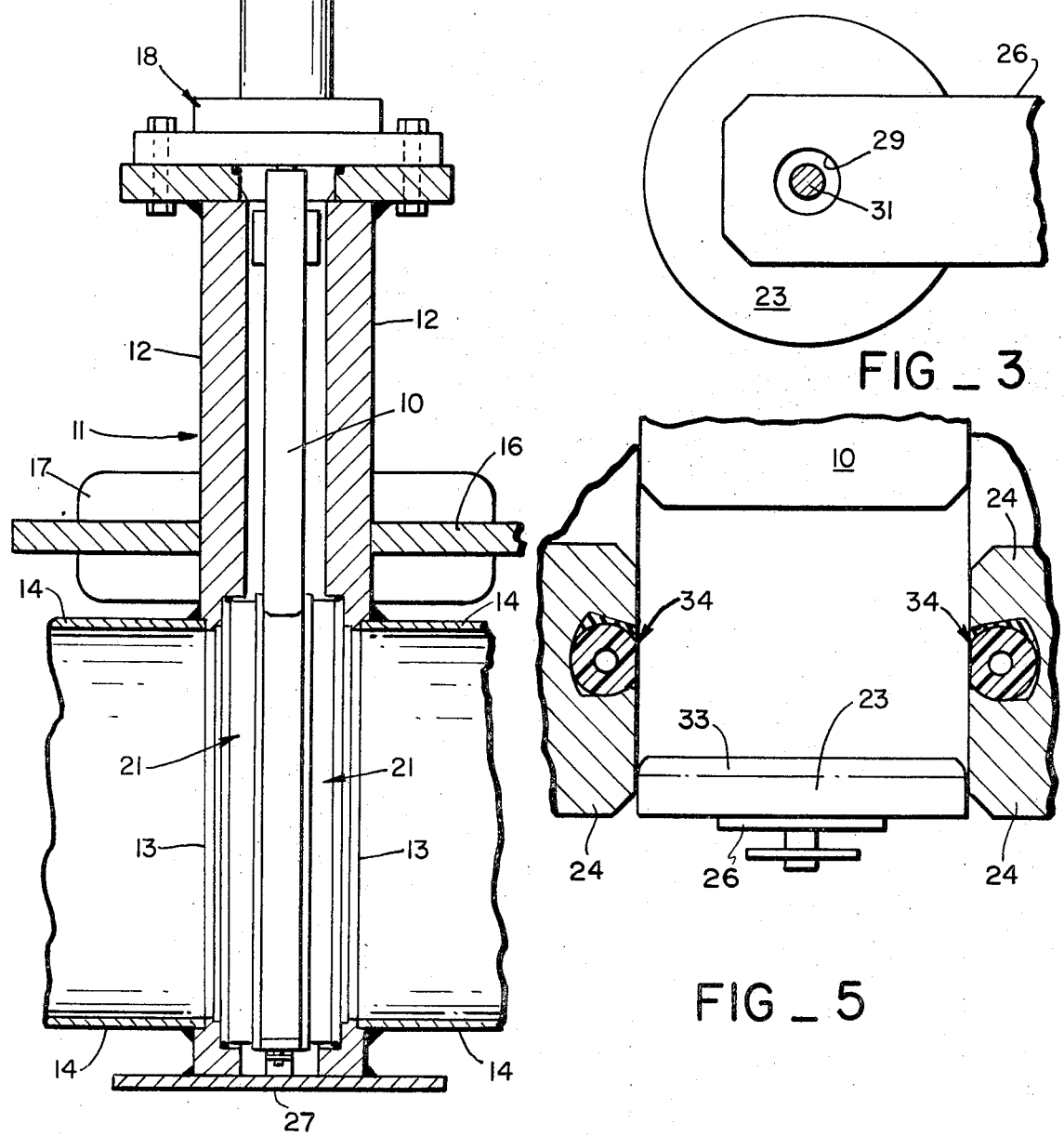

GATE VALVE

BACKGROUND OF THE INVENTION

In the construction of gate valves in the larger sizes (e.g., 12 to 48 inch or larger pipe diameter) it is desirable to use metal seat rings carried by the body and urged by springs against a flat or slab-like gate. The seat rings may have inserts of resilient material which establish sealing contact with the gate and also means (e.g., O-rings) is provided for establishing seals between the seat rings and the body. When the gate is of the through-port type, the complete face, i.e., 360° of each ring is in contact with the gate for both full open and closed positions. Also, more than 180° of each ring remains in contact with the gate during movement between open and closed positions. When the gate is not of the through-port type, but only sufficiently long for closed position, only a minor portion of each seat ring engages the gate for full open position. As a result, the springs acting upon the seat rings tend to deflect their unsupported portions toward each other whereby the spacing between the ring faces becomes substantially less than the thickness of the gate. When the gate remains open for substantial periods of time, it is not uncommon for sediment to accumulate within the body recesses that accommodate the rings, with the result that it may be difficult if not impossible to close the valve because the sediment prevents the rings from returning to their proper positions. To prevent this difficulty, it has been proposed to provide each ring with retaining clips or lugs which are carried by the body and which limit the extent to which the rings may be projected by the seat ring springs. Such expedients have not been satisfactory for several reasons. The retaining clips or lugs make it difficult to assemble the seats within the body and to replace the seat rings under field contitions. In addition, such expedients when so constructed as to permit movement of the seat rings to accommodate for lateral movements of the gate, do not prevent the type of jamming due to accumulation of sediment as described above.

SUMMARY OF THE INVENTION

This invention relates generally to valves of the gate type when made in larger sizes and is applicable where the gate of the valve is of the short type, as distinguished from a through-port gate, and where seat rings are carried by the body and urged toward the gate by springs.

In general, it is an object of the present invention to provide a gate valve of the above character with effective means serving to maintain a desired spacing between the seat rings whereby the valve will not be subject to jamming due to accumulation of sediment.

Another object of the invention is to provide means of the above character which is automatically effective when the gate is first inserted between the rings, and which is not affected by lateral gate movements.

Another object of the invention is to provide a gate valve having seat spreader means which does not interfere with seat ring assembly or replacement.

In general, the present invention consists of a valve body including end walls having aligned openings forming fluid flow passages. Annular sealing assemblies surround the flow passages and provide seals between the body and the parallel side surfaces of the gate. Each of the sealing assemblies consists of a seat ring that is movably fitted in an annular recess formed in the body, each seat ring being sealed with respect to the body. Resilient sealing means is carried by the seat rings and serves to establish fluid-tight seals with the side surfaces of the gate. Valve operating means is carried by the upper portion of the body and serves to move the gate between full open and closed positions. Springs act between the body and the seat rings and serve to urge the seat rings against the gate. The dimensions of the gate are such that when in full open position it is engaged by the seat rings over an arc of less than 180°. Means is provided in that end of the body remote from the valve operator which is movable to a position between the seat rings for maintaining a predetermined spacing between the rings substantially equal to the thickness of the gate when the gate is in open position. This means does not interfere with movement of the gate to full closed position, and it does not interfere with assembly of the rings in the valve body during manufacture or replacement of seat rings under field conditions.

Additional objects and features of the invention will appear from the following description in which the preferred embodiments have been set forth in detail in conjunction with the accompanying drawing.

DESCRIPTION OF THE DRAWING

FIG. 1 is a side elevational view, partly in section, illustrating a gate valve incorporating the invention.

FIG. 2 is a detail in section, illustrating the seat ring spreader means incorporated in the valve of FIG. 1.

FIG. 3 is a detail in section illustrating the attachment of the spreader member to the spring means.

FIG. 5 is a view like FIG. 4 but showing the gate being moved toward open position, with the spreader member being disposed between the seat rings.

DESCRIPTION OF THE PREFERRED EMBODIMENTS

Figure 4:
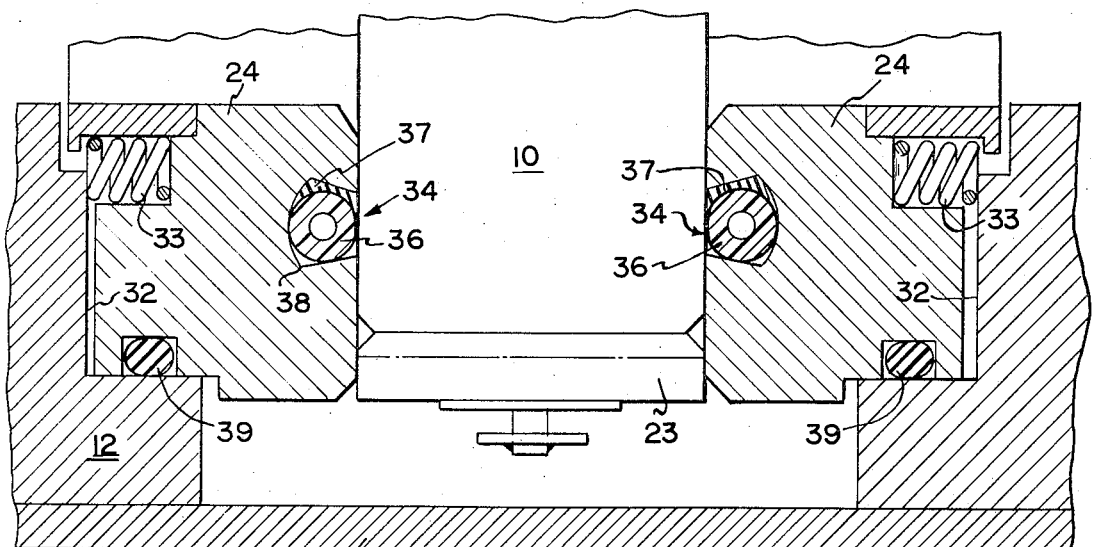
FIG. 4 is an enlarged detail in section illustrating the positioning of the parts when the gate is in fully closed position.

The valve as illustrated in FIG. 1 consists of the slab-like gate 10 which is within the valve body 11. It is assumed that the valve body in this instance is of fabricated construction and is box-like in section. It includes the end walls 12 which are provided with openings 13 forming aligned flow passages. Pipe sections 14 are shown welded to the end walls 12 and may be hubs provided with coupling flanges, transition pieces, or a portion of the pipe with which the valve is associated. The end walls 12 may be reinforced by ribs 16, the ends of which are connected by the side plates 17. The upper portion of the body 11 is provided with the bonnet assembly 18 which serves to mount the valve operator 19. The operator may be either of the hand or power type, as for example a hand wheel operating through gearing, a pneumatic operator energized by gas under pressure, an operator of the electrical motor type, or a hydraulic operator consisting of a double-acting cylinder-piston assembly. In any event, the operator connects with a valve operating rod which in turn is connected to the gate 10 and which extends through the bonnet assembly 18. Annular sealing assemblies 21 surround the flow passages and serve to form seals between the end walls 12 and the parallel side surfaces of the slab-like gate 10. The gate in this instance is of the short type, and when in full open position as shown in FIG. 1, its lower portion is between the upper arcuate portions of the sealing assemblies 21. When in fully closed position, its side surfaces are in contact with the sealing assemblies over 360°. The lower end of the gate may be square, rounded or arcuate as in U.S. Pat. No. 3,372,900.

Each sealing assembly 21 includes a metal seal ring which is carried within a recess formed in the body and which is urged by springs against the gate. Therefore, when the gate is in the full open position shown in FIG. 1 and engages only a minor portion of each ring, it will be apparent that the lower portions of the ring may be deflected by the springs to a position where the spacing between the seat ring faces is substantially less than the thickness of the gate. Under such circumstances, movement of the gate to closed position must necessarily be accompanied by a substantial movement of the seat rings into their recesses, and if the recesses should be filled with sediment, jamming will result.

According to the present invention, seat ring spreader means is provided in the lower portion of the valve body. In the embodiment illustrated in FIGS. 1 – 5 the spreader means includes a disk-like spreader member 23 which is disposed adjacent the lower portions of the metal seat rings 24 and generally aligned with the center line of the gate. The spreader member 23 is carried by spring means, which in this instance is a member 26 in the form of a leaf spring made of spring steel. As shown in FIG. 2 the leaf spring 26 has its one end anchored to the bottom 27 of the valve body by the anchoring member 28. Its free end has an opening 29 (FIG. 3) which loosely accommodates a small diameter retaining projection 31 of the part 23. This retaining projection has an enlarged head or washer 32 which can be attached by tack welding to the small diameter projection. The upper edge portion is bevelled or tapered as indicated at 33.

FIG. 4 also shows the type of sealing assemblies disclosed in copending application Ser. No. 17,365 filed Mar. 9, 1970, said application being a continuation-in-part of earlier filed applications Ser. No. 679,138 and 773,785. The metal seat rings in this instance are fitted within the recesses 32 formed in the end walls 12, and each ring is urged toward the gate by a plurality of circumferentially spaced coil compression springs 33. Each seat ring is also provided with sealing means 34 of resilient material for making sealing contact with the adjacent surface of the gate. When constructed as disclosed in said application Ser. No. 17,365, it consists of an annulus 36 made of relatively hard resilient material, like nylon, together with a member 37 made of more resilient material, such as a suitable synthetic rubber or elastomer. The assembly comprising the nylon annulus 36 and the annular member 37 is disposed within an accommodating recess 38 with both members being in radial compression. The arrangement is such that the exposed annular surfaces of both members 36 and 37 are adapted to make contact with the adjacent surface of the gate. In addition to the sealing means 34 for contacting the gate, the seat ring is sealed with respect to the body by suitable means such as a resilient O-ring 39.

FIG. 4 shows the positioning of the spreader member 23 when the gate is in fully closed position. The side surfaces of the gate at that time engage the seat rings over 360°. The spreader member 23 is in engagement with the bottom of the gate, and is held in this position by the leaf spring 26. When the gate is moved upwardly toward full open position, as shown in FIG. 5, the spreader member 23 remains in the same position as shown in FIG. 5, between the lower portions of the seat rings 24. In this connection it will be noted that the spreader member 23 is dimensioned whereby it retains a spacing between the seat rings that is only slightly less than the thickness of the gate. Therefore no substantial spreading of the seat rings is necessary to accommodate the return of the gate to closed position. It will be readily apparent that, for both the open and closed positions of the gate, the spreader member 23 directly engages the opposed faces of the seat rings 24; that is, the spreader member directly engages the seat rings radially inwardly of the outer circumferences thereof.

As previously mentioned, with a gate valve as described above the gate is pemitted a certain amount of lateral movement in the direction of the flow passages, and such movement is accommodated by corresponding movements of the seat rings. For example, when the gate is in closed position and line pressure is applied to one side of the same, the gate assumes a position against the downstream seat ring, and the downstream seat ring in turn assumes a position in direct abutting engagement with the valve body. When pressure upon the valve is equalized, the gate assumes an intermediate position under the urge of the springs 33. If there is a reversal in the direction of line flow, the gate is urged against the other seat ring, and this ring in turn is urged into direct abutting engagement with the valve body on the downstream side. The spreader means described above is constructed to accommodate such gate and seat ring movements. This is because of the loose retention of the stud 31 in the opening 29, which permits ample movement of the spreader member 23 to accommodate for lateral movements of the gate.

The spreader means described above does not interfere with factory assembly of the seat rings, or their replacement under field conditions. Assuming that the spreader means is installed in the lower portion of the valve body before the seat rings are introduced into their recesses, the spreader member 23 is temporarily depressed by a suitable tool to a position below the rings, while the seat rings are being placed in proper position. Thereafter when the gate is inserted between the rings and moved toward closed position, the lower portions of the rings are moved apart to permit the spreader member to assume the position in FIG. 4. Likewise, if it is desired to replace the seat rings, the spreader member 23 can be depressed out of engagement with the rings, thus permitting the seat rings to be removed and reintroduced without difficulty.

It will be apparent that the spreader means described above will prevent the type of jamming previously described due to accumulation of sediment behind the seat rings. When the gate is in full open position, the lower portions of the seat rings cannot assume positions in which the spacing between their opposed faces is substantially less than the thickness of the gate. Thus, no substantial spreading of the lower portions of the rings occurs when the gate is moved to closed position. Therefore, even if some accumulation of sediment should occur behind the seat rings, it cannot interfere with closing of the gate, or in other words cannot cause jamming.

Figure 6:
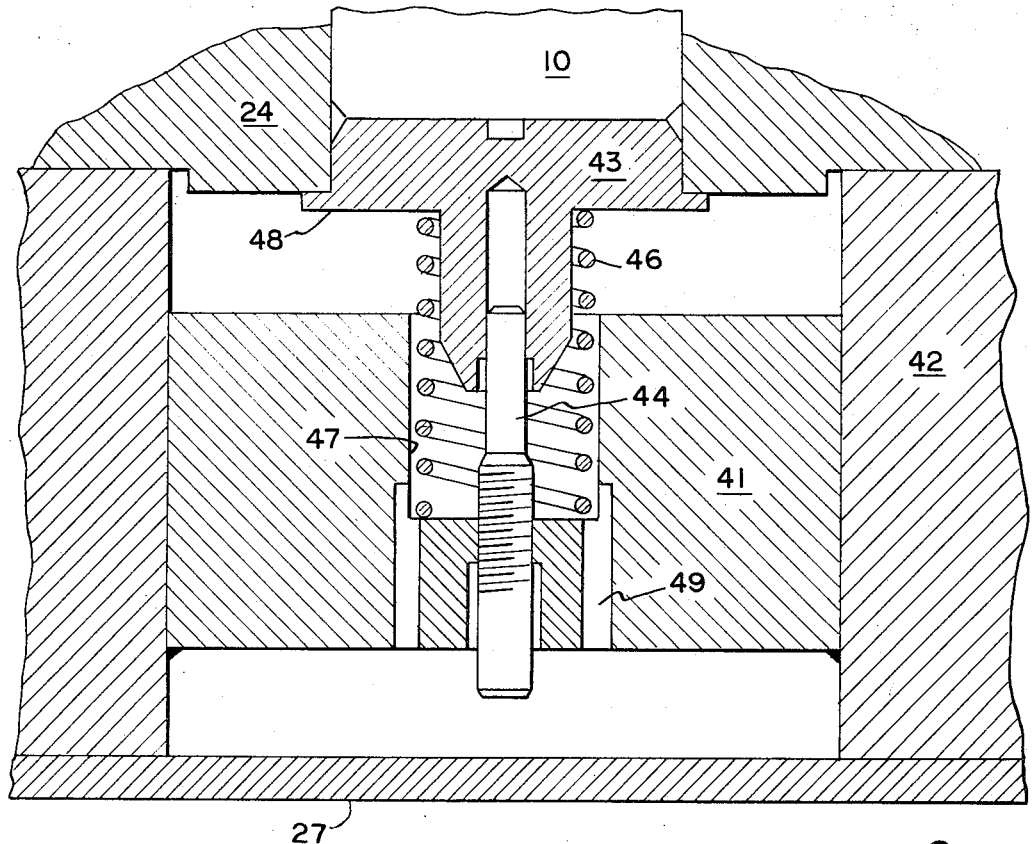
FIG. 6 is a detail in section showing another embodiment of the invention using a spring of the coil type.

The embodiment illustrated in FIG. 6 consists of a mounting block 41 which is secured as by means of tack welding to the lower portions of the end walls 42 of the body. The spreader member 43 is again in the form of a disk and is slidably carried by a vertical stud 44, the lower end of which is secured to the mounting block 44. A coil spring 46 is accommodated in a bore 47 provided in the mounting block and normally urges the spreader member 43 upwardly. A flange 48 is shown on the spreader member 43 and serves to limit upward movement of the spreader by engaging the seat rings 24. The bore 47 is shown communicating with the space below the same through holes 49 to prevent accumulation of sediment.

The embodiment of FIG. 6 operates in substantially the same manner as the first described embodiment.

We claim:

1. In a gate valve construction a valve body having end walls with aligned openings forming fluid flow passages, a valve gate disposed within the body and movable between full open and closed positions relative to the flow passages, annular sealing assemblies surrounding the flow passages and serving to establish seals between the body and the side surfaces of the gate, each of said sealing assemblies including a metal seat ring and spring means for urging the seat ring toward the gate, the gate being dimensioned whereby when in full open position it engages only a minor portion of each of the seat rings, means at the upper part of the body for operating the gate and spreader means interposed between the lower portions of the seat rings for both open and closed positions of the gate, said spreader means serving to maintain a desired predetermined spacing between the lower portions of the seat rings when the gate is moved to its open position, said spreader means consisting of a single spreader member and yieldable means normally positioning the spreader member between the lower portions of the seat rings to directly engage said seat rings radially inwardly of the outer circumferences thereof, said spreader member being movable downwardly against the urge of said yieldable means to an out of the way position.

2. A valve construction as in claim 1 in which said spreader member is normally located between the lower portions of the seat rings and generally aligned with the line of center of the gate in that end of the body remote from the operating means.

3. A valve construction as in claim 1 in which the spreader member is disc shaped with its upper edge portion beveled or tapered.

* * * * *